United States Patent
Frosio et al.

(10) Patent No.: US 12,452,542 B2
(45) Date of Patent: Oct. 21, 2025

(54) HALLUCINATING DETAILS FOR OVER-EXPOSED PIXELS IN VIDEOS USING LEARNED REFERENCE FRAME SELECTION

(71) Applicant: NVIDIA CORPORATION, Santa Clara, CA (US)

(72) Inventors: Iuri Frosio, Bergamo (IT); Yazhou Xing, Shenzhen (CN); Chao Liu, Pittsburgh, PA (US); Anjul Patney, Kirkland, WA (US); Hongxu Yin, San Jose, CA (US); Amrita Mazumdar, San Francisco, CA (US); Jan Kautz, Lexington, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 105 days.

(21) Appl. No.: 18/406,006

(22) Filed: Jan. 5, 2024

(65) Prior Publication Data
US 2024/0251171 A1    Jul. 25, 2024

Related U.S. Application Data

(60) Provisional application No. 63/481,380, filed on Jan. 24, 2023.

(51) Int. Cl.
*H04N 23/73*    (2023.01)
*H04N 23/95*    (2023.01)

(52) U.S. Cl.
CPC ............. *H04N 23/73* (2023.01); *H04N 23/95* (2023.01)

(58) Field of Classification Search
CPC ...... H04N 23/73; H04N 23/95; H04N 19/172; H04N 19/132; G06T 5/60; G06V 10/62
See application file for complete search history.

(56) References Cited

U.S. PATENT DOCUMENTS

| | | | |
|---|---|---|---|
| 11,783,461 B2 * | 10/2023 | Lu | G06T 5/60 |
| | | | 382/156 |
| 2019/0130583 A1 * | 5/2019 | Chen | G06T 7/194 |
| 2021/0168395 A1 * | 6/2021 | Cricri | G06N 3/084 |
| 2022/0301275 A1 * | 9/2022 | Khadloya | G06V 10/62 |

(Continued)

OTHER PUBLICATIONS

Cogalan et al., "Learning HDR video reconstruction for dual-exposure sensors with temporally-alternating exposures", Computers & Graphics, vol. 105, Dec. 30, 2021, pp. 1-21.

(Continued)

*Primary Examiner* — Hung H Lam
(74) *Attorney, Agent, or Firm* — Artegis Law Group, LLP

(57) ABSTRACT

One or more embodiments include receiving one or more frames of a live video captured by a video capturing device, wherein the one or more frames include a current frame that is most-recently captured, identifying a set of reference frames included in the one or more frames based on at least the current frame, wherein each frame in the set of reference frames has a different exposure level relative to the current frame, determining, using one or more neural networks, a set of missing details for one or more regions of the current frame based on the set of reference frames, generating an updated version of the current frame based on the set of details, and outputting the updated version of the current frame in real-time.

20 Claims, 9 Drawing Sheets

(56) References Cited

U.S. PATENT DOCUMENTS

| | | | |
|---|---|---|---|
| 2024/0098216 A1* | 3/2024 | Pottorff | H04N 19/132 |
| 2024/0323416 A1* | 9/2024 | Ryder | H04N 19/172 |

OTHER PUBLICATIONS

Bernacki, Jaroslaw, "Automatic Exposure Algorithms for Digital Photography", Multimedia Tools and Applications, https://doi.org/10.1007/s11042-019-08318-1, vol. 79, Jan. 22, 2020, pp. 12751-12776.

Eilertsen et al., "HDR Image Reconstruction from a Single Exposure Using Deep CNNs", ACM Transactions on Graphics, arXiv:1710.07480v1, vol. 36, No. 6, Article 178, Nov. 2017, pp. 178:1-178:15.

Elharrouss et al., "Image Inpainting: A Review", arXiv:1909.06399, Sep. 13, 2019, 21 pages.

Blender Foundation, "Tears of Steel", Mango Open Movie Project, Retrieved from https://mango.blender.org., on Apr. 20, 2025, pp. 1-8.

Gowda et al., "Smart Frame Selection for Action Recognition", Proceedings of the AAAI Conference on Artificial Intelligence, https://doi.org/10.1609/aaai.v3512.16235, vol. 2, May 2021, pp. 1451-1459.

Hasinoff et al., "Burst Photography for High Dynamic Range and Low-Light Imaging on Mobile Cameras", https://doi.org/10.1145/2980179.2980254, ACM Trans. Graph., vol. 35, No. 6, Article 192, Nov. 2016, pp. 192: 1-192:12.

He et al., "Deep Residual Learning for Image Recognition", CVPR, https://doi.org/10.1109/CVPR.2016.90, 2016, pp. 770-778.

Hoang et al., "Recent Trending on Learning Based Video Compression: A Survey", Cognitive Robotics, https://doi.org/10.1016/j.cogr.2021.08.003, vol. 1, 2021, pp. 145-158.

Hu et al., "FVC: A New Framework towards Deep Video Compression in Feature Space", CVPR, arXiv:2105.09600, Aug. 23, 2021, 10 pages.

Iizuka et al., "Globally and Locally Consistent Image Completion", https://doi.org/10.1145/3072959.3073659, ACM Transactions on Graphics, vol. 36, No. 4, Article 107, Jul. 2017, pp. 107:1-107:14.

Yu et al., "Generative Image Inpainting with Contextual Attention", https://doi.org/10.1109/CVPR.2018.00577, CVPR, 2018, pp. 5505-5514.

Kalantari et al., "Deep HDR Video from Sequences with Alternating Exposures", Eurographics, https://doi.org/10.1111/cgf.13630, vol. 38, No. 2, 2019, pp. 193-205.

Dosovitskiy et al., "An Image is Worth 16×16 Words: Transformers for Image Recognition at Scale", arXiv:2010.11929, ICLR, Jun. 3, 2021, pp. 1-22.

Lee et al., "Copy-and-Paste Networks for Deep Video Inpainting", arXiv:1908.11587, ICCV, Aug. 30, 2019, 9 pages.

Li et al., "MAT: Mask-Aware Transformer for Large Hole Image Inpainting", CVPR, 2022, 16 pages.

Li et al., "Towards An End-to-End Framework for Flow-Guided Video Inpainting", arXiv:2204.02663, CVPR, Apr. 7, 2022, pp. 1-16.

Liang et al., "SwinIR: Image Restoration Using Swin Transformer", arXiv:2108.10257, Aug. 23, 2021, pp. 1-12.

Liang et al., "An Auto-exposure Algorithm for Detecting High Contrast Lighting Conditions", IEEE, https://doi.org/10.1109/ICASIC.2007.4415733, 2007, pp. 725-728.

Liu et al., "Image Inpainting for Irregular Holes Using Partial Convolutions", ECCV, arXiv:1804.07723, Dec. 15, 2018, pp. 1-23.

Liu et al., "FuseFormer: Fusing Fine-Grained Information in Transformers for Video Inpainting", ICCV, arXiv:2109.02974, Sep. 7, 2021, 10 pages.

Liu et al., "Single-Image HDR Reconstruction by Learning to Reverse the Camera Pipeline", IEEE Conference on Computer Vision and Pattern Recognition, 2020, pp. 1651-1660.

Marnerides et al., "ExpandNet: A Deep Convolutional Neural Network for High Dynamic Range Expansion from Low Dynamic Range Content", https://doi.org/10.1111/cgf.13340, vol. 37, No. 2, 2018, pp. 37-49.

Meng et al., "AdaFuse: Adaptive Temporal Fusion Network for Effcient Action Recognition", ICLR, arXiv:2102.05775, Feb. 10, 2021, pp. 1-15.

Mertens et al., "Exposure Fusion: A Simple and Practical Alternative to High Dynamic Range Photography", Computer Graphics Forum, vol. 28, No. 1, 2009, pp. 161-171.

Mnih et al., "Asynchronous Methods for Deep Reinforcement Learning", arXiv:1602.01783, Jun. 16, 2016, 19 pages.

Ou et al., "Real-Time Tone Mapping: A Survey and Cross Implementation Hardware Benchmark", IEEE Transactions on Circuits and Systems for Video Technology, https://doi.org/10.1109/tcsvt.2021.3060143, vol. 32, No. 5, May 2022, pp. 1-21.

Raffel et al., "Exploring the Limits of Transfer Learning with a Unified Text-to-Text Transformer", Journal of Mach. Learn. Res., vol. 21, No. 1, Article 140, arXiv:1910.10683, Sep. 19, 2023, pp. 1-67.

Raffin et al., "Stable-Baselines3: Reliable Reinforcement Learning Implementations", Journal of Machine Learning Research, vol. 22, No. 268, 2021, pp. 1-8.

Santos et al., "Single Image HDR Reconstruction Using a CNN with Masked Features and Perceptual Loss", https://doi.org/10.1145/3386569.3392403, ACM Trans. Graph., vol. 39, No. 4, Article 80, Jul. 2020, pp. 80:1-80:10.

Su et al., "Fast and Robust Camera's Auto Exposure Control Using Convex or Concave Model", IEEE International Conference on Consumer Electronics (ICCE), https://doi.org/10.1109/ICCE.2015.7066300, 2015, pp. 13-14.

Tursun et al., "The State of the Art in HDR Deghosting: A Survey and Evaluation", Computer Graphics Forum, vol. 34, No. 2, https://doi.org/10.1111/cgf.12593, 2015, pp. 683-707.

Wang et al., "Pyramid Vision Transformer: A Versatile Backbone for Dense Prediction without Convolutions", In Proceedings of the IEEE/CVF International Conference on Computer Vision (ICCV), arXiv:2102.12122, Aug. 11, 2021, 15 pages.

Wang et al., "Image Quality Assessment: From Error Visibility to Structural Similarity", IEEE Transactions on Image Processing, vol. 13, No. 4, Apr. 2004, pp. 1-14.

Wu et al., "AdaFrame: Adaptive Frame Selection for Fast Video Recognition", CVPR, 2019, pp. 1278-1287.

Xu et al., "YouTube-VOS: Sequence-to-Sequence Video Object Segmentation", arXiv:1809.00461, Sep. 3, 2018, pp. 1-17.

Xu et al., "YouTube-VOS: A Large-Scale Video Object Segmentation Benchmark", arXiv:1809.03327, Sep. 6, 2018, pp. 1-10.

Yang et al., "Learning Texture Transformer Network for Image Super-Resolution", arXiv:2006.04139, Jun. 22, 2020, 22 pages.

Yuan et al., "HRFormer: High-Resolution Transformer for Dense Prediction", Advances in Neural Information Processing Systems, arXiv:2110.09408, vol. 34, Nov. 7, 2021, pp. 1-15.

Zeng et al., "Learning Joint Spatial-Temporal Transformations for Video Inpainting", arXiv:2007.10247, Jul. 20, 2020, pp. 1-23.

* cited by examiner

HALLUCINATING DETAILS FOR OVER-EXPOSED PIXELS IN VIDEOS USING LEARNED REFERENCE FRAME SELECTION

CROSS-REFERENCE TO RELATED APPLICATIONS

This application claims the priority benefit of United States provisional patent application titled, "OVER-EXPOSED PIXELS HALLUCINATION IN VIDEOS WITH LEARNED REFERENCE FRAME SELECTION," filed on Jan. 24, 2023, and having Ser. No. 63/481,380. The subject matter of this related application is hereby incorporated herein by reference.

BACKGROUND

Field of the Invention

Embodiments of the present disclosure relate generally to video processing and, more specifically, to hallucinating details for over-exposed pixels in videos using learned reference frame selection.

Description of the Related Art

Commercial digital cameras and video acquisition devices, such as webcams, are low dynamic range (LDR) devices that are unable to capture the full range of illumination of a scene. The dynamic range measures the ratio between the brightest and darkest part of an image. Low dynamic range devices are incapable of handling wide dynamic range inputs, frequently leading to over or under exposed areas. An overexposed area is one that is so bright that the device cannot capture detail and shows up as white in the captured image. An underexposed area is one that is so dark that the device cannot capture detail and shows up as black in the captured image. In the case of still images, autoexposure can drive the exposure time and sensor gain to control the overall frame brightness and capture the most relevant scene detail in LDR. However, in the case of videos, the time response from autoexposure is not immediate, leading to globally over or under exposed frames during light transitions, and local areas of the LDR frames may still be under or over exposed.

High dynamic range (HDR) refers to techniques that increase the dynamic range of photos and videos. Traditional HDR methods use multiple exposures, where the missing details in the over or under exposed areas are reconstructed from reference frames, guaranteeing the reconstructed image matches the real scene. The current state of the art in HDR techniques is alternating exposure, which creates HDR images by combining multiple reference images of the same scene taken at different exposure levels. However, multiple exposure methods require full camera control as well as computationally intensive frame alignment and merging.

Image inpainting, where HDR details are hallucinated, is another method used to fill overexposed areas. In these methods, HDR details are hallucinated using a deep neural network (DNN) trained on the LDR content. The HDR details may look plausible to a human observer but are synthetically added to the image by the DNN. One drawback to image inpainting techniques is that there is a lack of large HDR datasets, thus requiring the DNNs to be pretrained on LDR inpainting data or simulated HDR data. However, there is no guarantee that the simulated HDR data generates a realistic scene, and fake details may be magnified in large saturated areas. Furthermore, when processing videos, inpainting algorithms must consider both spatial and temporal information to achieve temporal and spatial consistency, which is computationally expensive. In addition, existing video inpainting algorithms require, for a given input frame, reference frames from points in time before and after the given input frame. This increases the overall latency of these algorithms, making those techniques unsuitable for real-time, live applications.

As the foregoing illustrates, what is needed in the art is an algorithm for HDR video hallucination based on a single reference frame, with real-time execution, low latency, and without requiring camera control.

SUMMARY

One advantage of the systems disclosed herein is the causal reference frame selection. Using only currently available reference frames and no future frames allows the system to work on-the-fly, with low latency, and without full camera control. In addition, the reference frame selection DNN stores the most promising frames that could be used for hallucinating HDR details in the future. Finally, the selection of fewer, good reference frames, rather than a large set of reference frames results in better inpainting results and has smaller computational cost. These technical advantages provide one or more technological improvements over prior art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present disclosure. However, it will be apparent to one of skill in the art that the present disclosure may be practiced without one or more of these specific details.

System Overview

Figure 1:
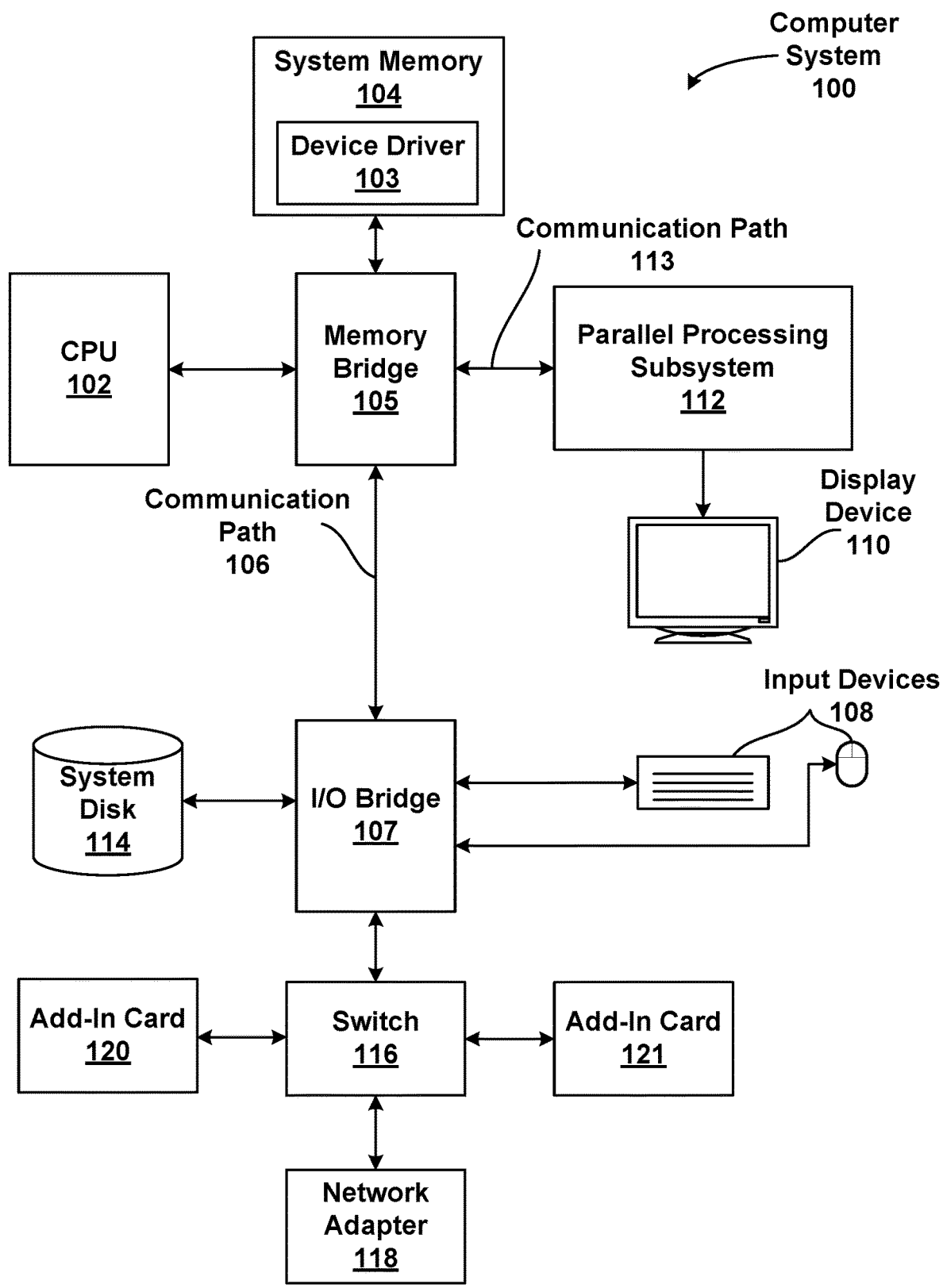
FIG. 1 is a block diagram of a computer system configured to implement various embodiments.

FIG. 1 is a block diagram of a computer system 100 configured to implement one or more aspects of the present disclosure. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116. As persons skilled in the art will appreciate, computer system 100 can be any type of technically feasible computer system, including, without limitation, a server machine, a server platform, a desktop machine, laptop machine, or a handheld/mobile device.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
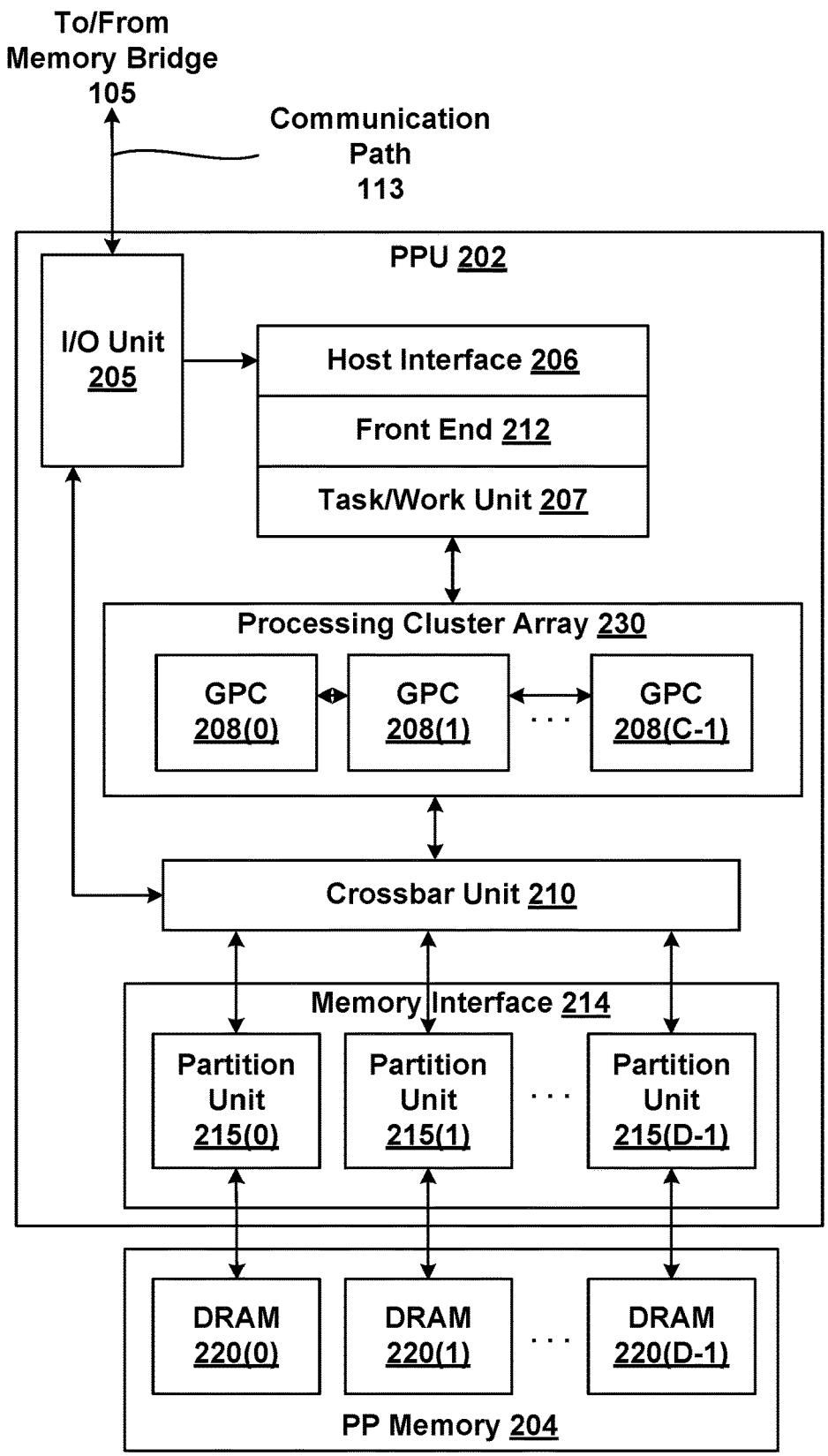
FIG. 2 is a block diagram of a parallel processing unit included in the parallel processing subsystem of FIG. 1, according to various embodiments.

FIG. 2 is a block diagram of a parallel processing unit (PPU) 202 included in the parallel processing subsystem 112 of FIG. 1, according to various embodiments of the present disclosure. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C☐1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D☐1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
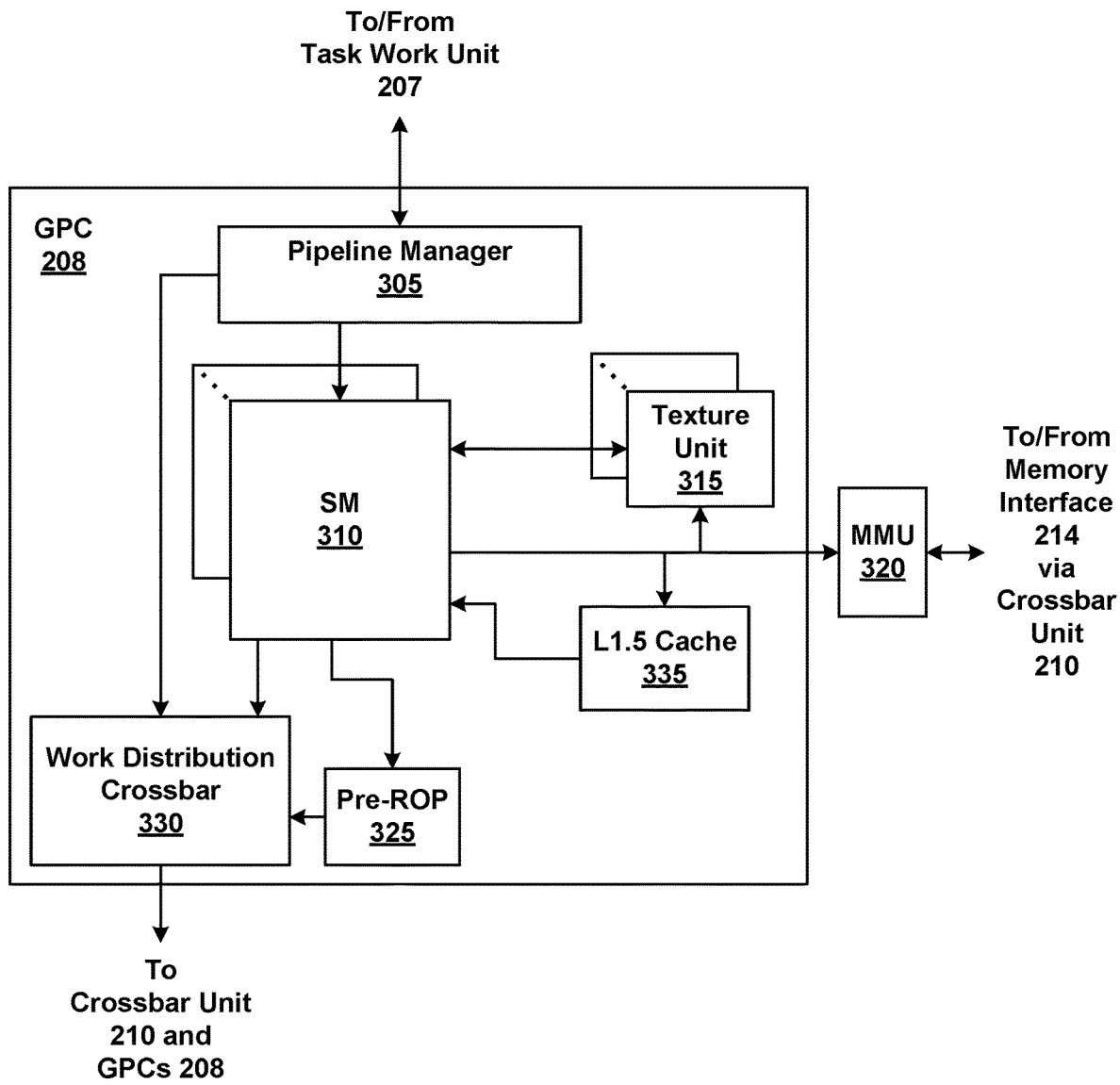
FIG. 3 is a block diagram of a general processing cluster included in the parallel processing unit of FIG. 2, according to various embodiments.

FIG. 3 is a block diagram of a GPC 208 included in PPU 202 of FIG. 2, according to various embodiments of the present disclosure. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present disclosure.

Hallucinating Details for Over-Exposed Pixels in Videos

Figure 4:
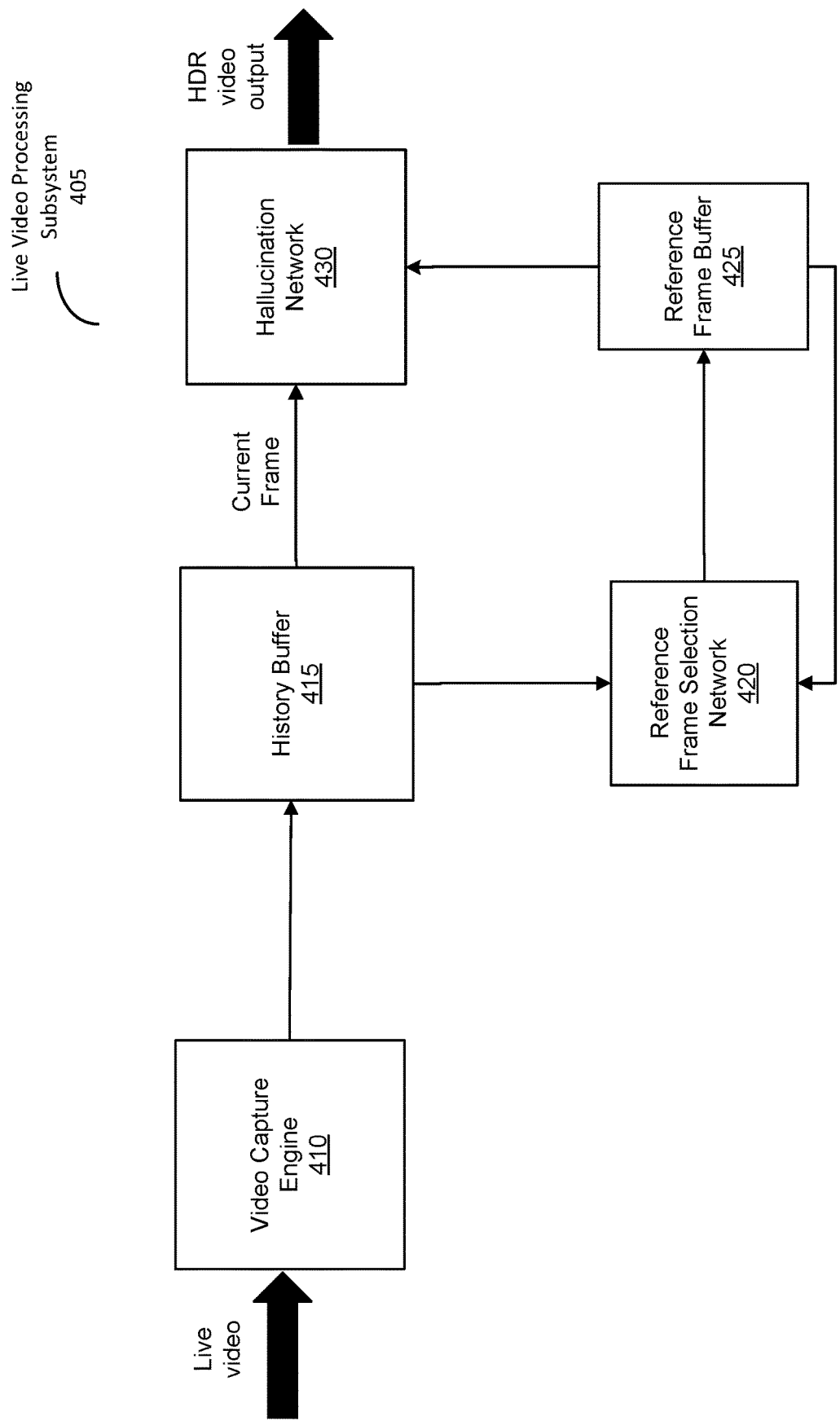
FIG. 4 is a block diagram a video acquisition device, according to various embodiments.

FIG. 4 is a block diagram of a live video processing subsystem 405 that may be implemented in conjunction with the computer system 100 of FIG. 1, according to various embodiments of the present disclosure. In various embodiments, live video processing subsystem 405 includes, without limitation, video capture engine 410, history buffer 415, reference frame selection network 420, reference frame buffer 425, and hallucination network 430. In various embodiments, live video processing subsystem 405 connects to the I/O bridge 107 of computer system 100. In other embodiments, one or more components of live video processing subsystem 405 are a part of computer system 100 or execute within computer system 100. For example, history buffer 415 may be included in system memory 104, and video capture engine 410, reference frame selection network 420, and hallucination network 430 may execute on CPU 102 or parallel processing subsystem 112.

Live video processing subsystem 405 enables users to capture video and audio for recording, editing, or live streaming via a video capture device (not shown). Examples of a video capture device includes a webcam, a camera-enabled smartphone, a camera-enabled tablet, and a digital camera.

Video capture engine 410 receives live video from a video capture device as a series of frames. Video capture engine 410 transmits the N most recent frames to history buffer 415. In various embodiments, N may be three frames, the current frame, $i_C^{LDR}$, and the previous two frames, $i_{C-1}^{LDR}$, $i_{C-2}^{LDR}$. Next, history buffer 415 sends the three most recent frames to reference frame selection network 420

Reference frame selection network 420 comprises an image classification machine learning model that determines the frames (referred to herein as "reference frames") used to hallucinate the missing details in future video frames. In various embodiments, an image classification machine learning models may include one or more recurrent neural networks (RNNs), one or more convolutional neural networks (CNNs), one or more deep neural networks (DNNs), one or more deep convolutional networks (DCNs), one or more residual neural networks (ResNets), one or more graph neural networks, one or more autoencoders, transformer neural networks, one or more deep stereo geometry networks (DSGNs), one or more stereo R-CNNs, or other types of artificial neural networks or components of artificial neural networks. Reference frame selection network 420 is trained using reinforcement learning. Reinforcement learning allows the machine learning model to learn using feedback, including rewards and punishments, from its actions.

Reference frame selection network 420 determines whether any of the frames in history buffer 415 should be moved into reference frame buffer 425. That is, reference frame selection network 420 decides if any of the frames $i_C^{LDR}$, $i_{C-1}^{LDR}$, $i_{C-2}^{LDR}$ better candidates than the current reference frame, $i_R^{LDR}$, to hallucinate missing details in future frames. The ideal reference frame $i_R^{LDR}$ should be as similar as possible spatially to the LDR frame to be hallucinated, but have different exposure to reveal details that are badly exposed.

In various embodiments where live video processing subsystem 405 receives video captured by a low dynamic range (LDR) device, many frames of the live video received by video capture engine 410 have over or under exposed areas. Hallucination network 430 comprises a transformer based deep neural network model used to hallucinate HDR details in the over or underexposed areas. Hallucination network 430 receives the current frame from history buffer 410 and the reference frames selected by the reference frame selection network 420 and stored in reference frame buffer 425. Hallucination network 430 hallucinates HDR details for the current frame based on the reference frame(s) in the reference frame buffer. In various embodiments, since the hallucinated HDR details are based on the reference frame(s), the hallucinated HDR details appear more realistic than if the hallucination network 430 were to generate the details without reference. Hallucination network 430 is described in further detail below in conjunction with FIG. 6.

Figure 5A:
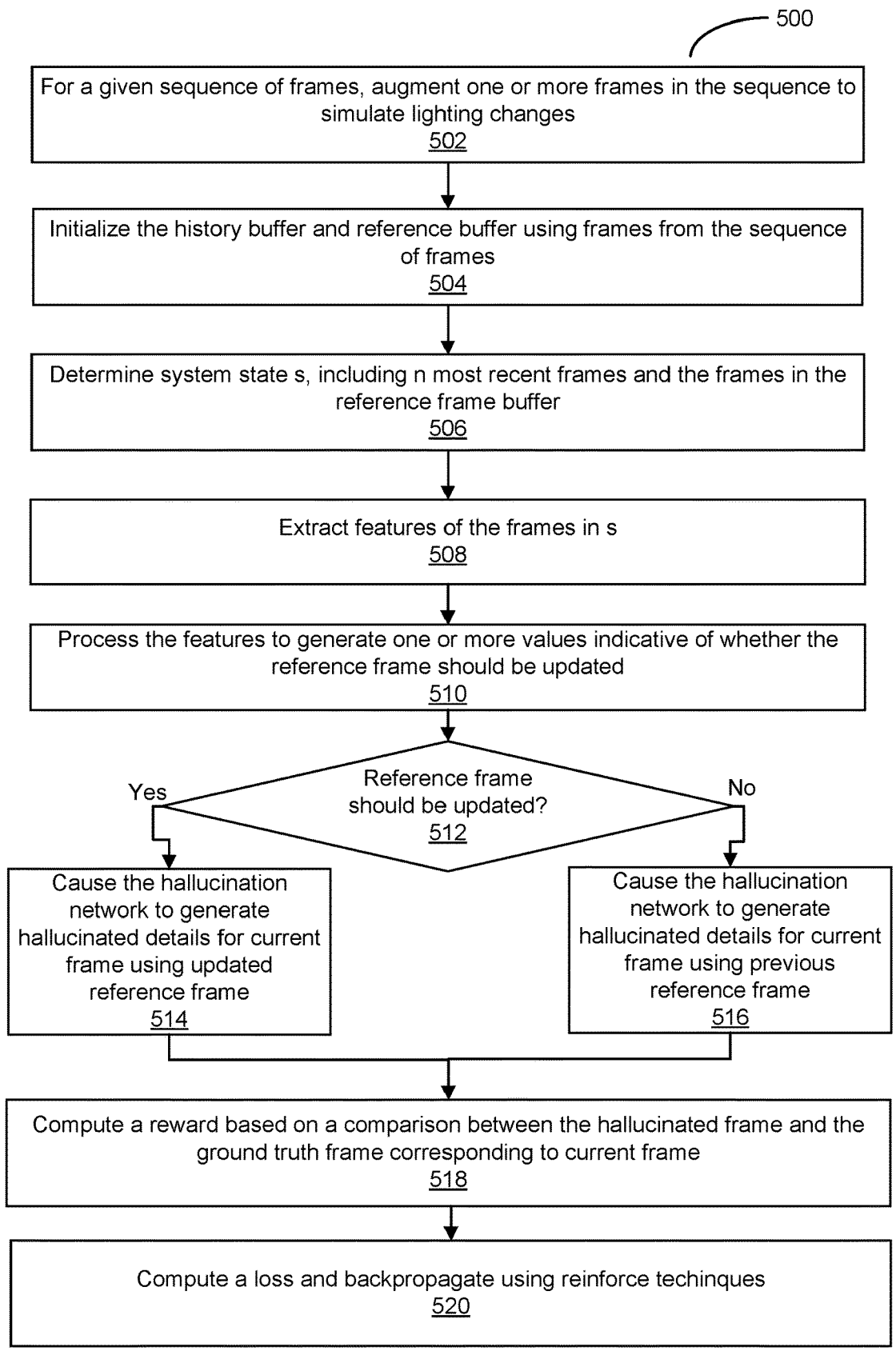
FIG. 5A is a flow diagram describing the method steps used to train reference frame selection network 420, according to various embodiments.

FIG. 5A is a flow diagram describing the method steps used to train reference frame selection network 420, according to various embodiments. Although the method steps are described with reference to the systems of FIGS. 1-4, persons skilled in the art will understand that any system configured to implement the methods steps, in any order, falls within the scope of the embodiments.

As shown, method 500 begins at step 502, wherein for a given sequence of video frames, a training engine executing on the CPU 102 augments one of more frames in the sequence to simulate lighting changes. In some embodiments, the augmentation process described in step 502 is optional. For example, in some embodiments, a given sequence of frames is acquired using an HDR camera. The HDR images are used as ground truth in the step 518 described below, and the dynamics of those frames are reduced to LDR to create the sequence of frames used in step 504. At step 504, the training engine initializes the history buffer 415 and the reference frame buffer 425 with the frames in the sequence of frames of step 502.

At step 506, the training engine determines system state $s=\{i_C^{LDR}, i_{C-1}^{LDR}, i_{C-2}^{LDR}, i_R^{LDR}\}$, consisting of the current frame, $i_C^{LDR}$, and the previous two frames, $i_{C-1}^{LDR}$, $i_{C-2}^{LDR}$ from history buffer 415 and the current reference frame, $i_R^{LDR}$, from reference frame buffer 425. At step 508, the features of the frames in system state s are extracted. At step 510, the reference frame selection network 420 processes the features to generate one or more values indicative of whether the reference frame should be updated. In one embodiment, one output is a value function used for training in reinforcement learning and the another output is the probability of pushing the contents of history buffer 410 to reference frame buffer 425.

At step 512, the training engine determines whether the reference frame should be updated. In one embodiment, the training engine samples the probability generated by the reference frame selection network 420 to determine whether the reference frame should be updated. If the reference frame should be updated, then the process proceeds to step 514, where the hallucination network 430 generates hallucinated details for a current frame using the updated reference frame. If, at step 512, the reference frame should not be updated, then the process proceeds to step 516, where the hallucination network 430 generates hallucinated details for the current frame using the previous reference frame.

At step 518, the training engine computes a reward based on a comparison between the hallucinated frame and the ground truth frame corresponding to the current frame. At step 520, the training engine computes a loss that is back-propagated to the reference frame selection network 520. In such a manner, the training of the reference frame selection network 520 continues until the performance of the network satisfies one or more training criteria.

Figure 5B:
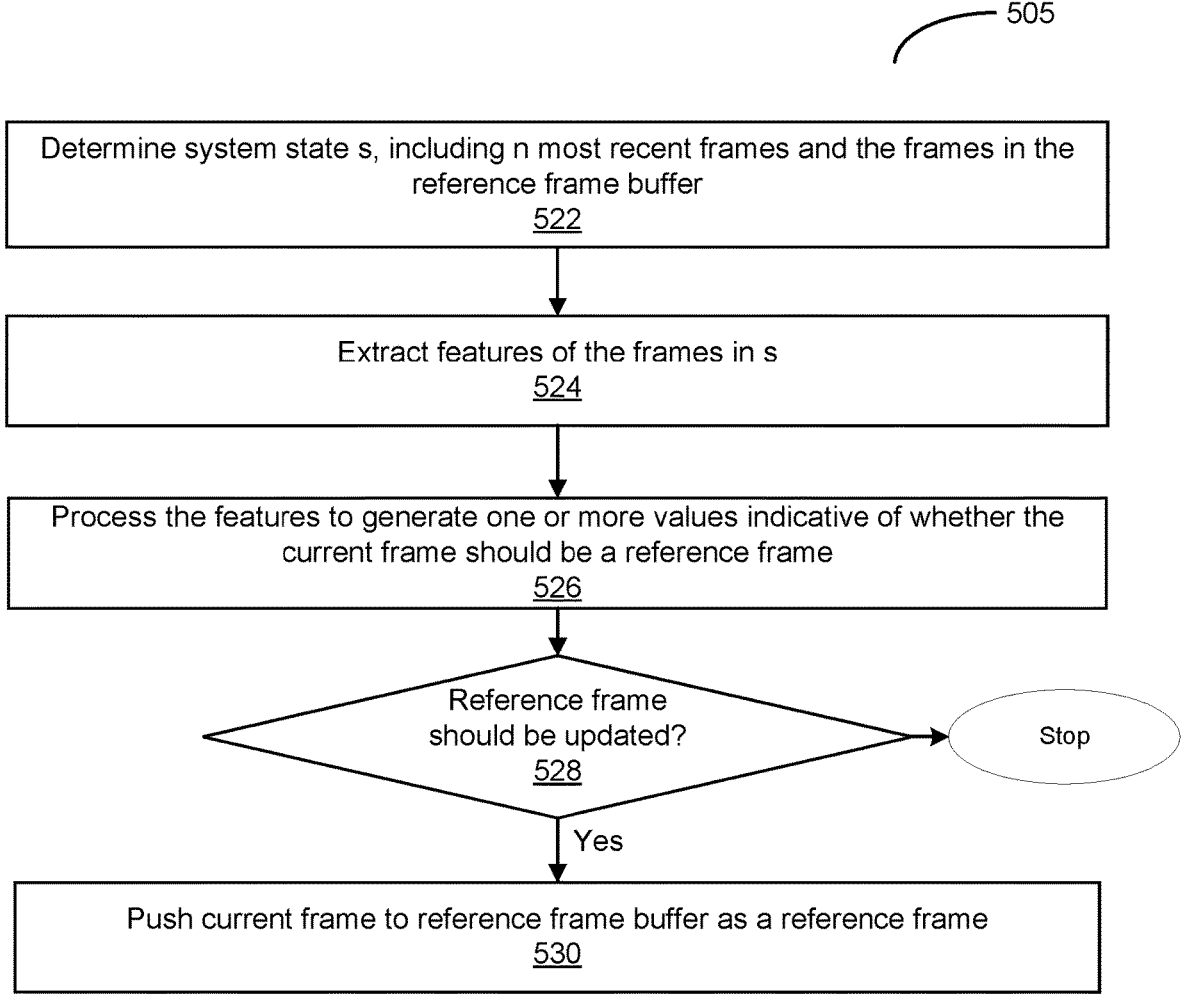
FIG. 5B is a flow diagram of method steps for selecting a reference frame, according to various embodiments.

FIG. 5B is a flow diagram describing the method steps for selecting a reference frame, according to various embodiments. Although the method steps are described with reference to the systems of FIGS. 1-4, persons skilled in the art will understand that any system configured to implement the methods steps, in any order, falls within the scope of the embodiments.

As shown, method 505 begins at step 520, where reference frame selection network 420 receives system state $s=\{i_C^{LDR}, i_{C-1}^{LDR}, i_{C-2}^{LDR}, i_R^{LDR}\}$, consisting of the current frame, $i_C^{LDR}$, and the previous two frames, $i_{C-1}^{LDR}, i_{C-2}^{LDR}$ from history buffer 415 and the current reference frame, $i_R^{LDR}$, from reference frame buffer 425. At step 524, the features of the frames in system state s are extracted. At step 526, the reference frame selection network 420 processes the features to generate one or more values indicative of whether the reference frame should be updated. In one embodiment, one output is a value function used for training in reinforcement learning and the another output is the probability of pushing the contents of history buffer 410 to reference frame buffer 425.

At step 528, the subsystem 405 determines whether the reference frame should be updated. In one embodiment, the subsystem 405 samples the probability generated by the reference frame selection network 420 to determine whether the reference frame should be updated. In another embodiment, the subsystem 405 compares the probability to a threshold value to determine whether the reference frame should be updated. If the reference frame should be updated, then the process proceeds to step 530, where the current frame(s) are pushed into the reference frame buffer 425 as reference frames. In some embodiments, the decision to push the contents of history buffer 410 to reference frame buffer 425 is made by thresholding at 0.5. If, however, at step 528, the reference frame should not be updated, then the process stops and the reference frame buffer 425 is not updated.

Figure 6:
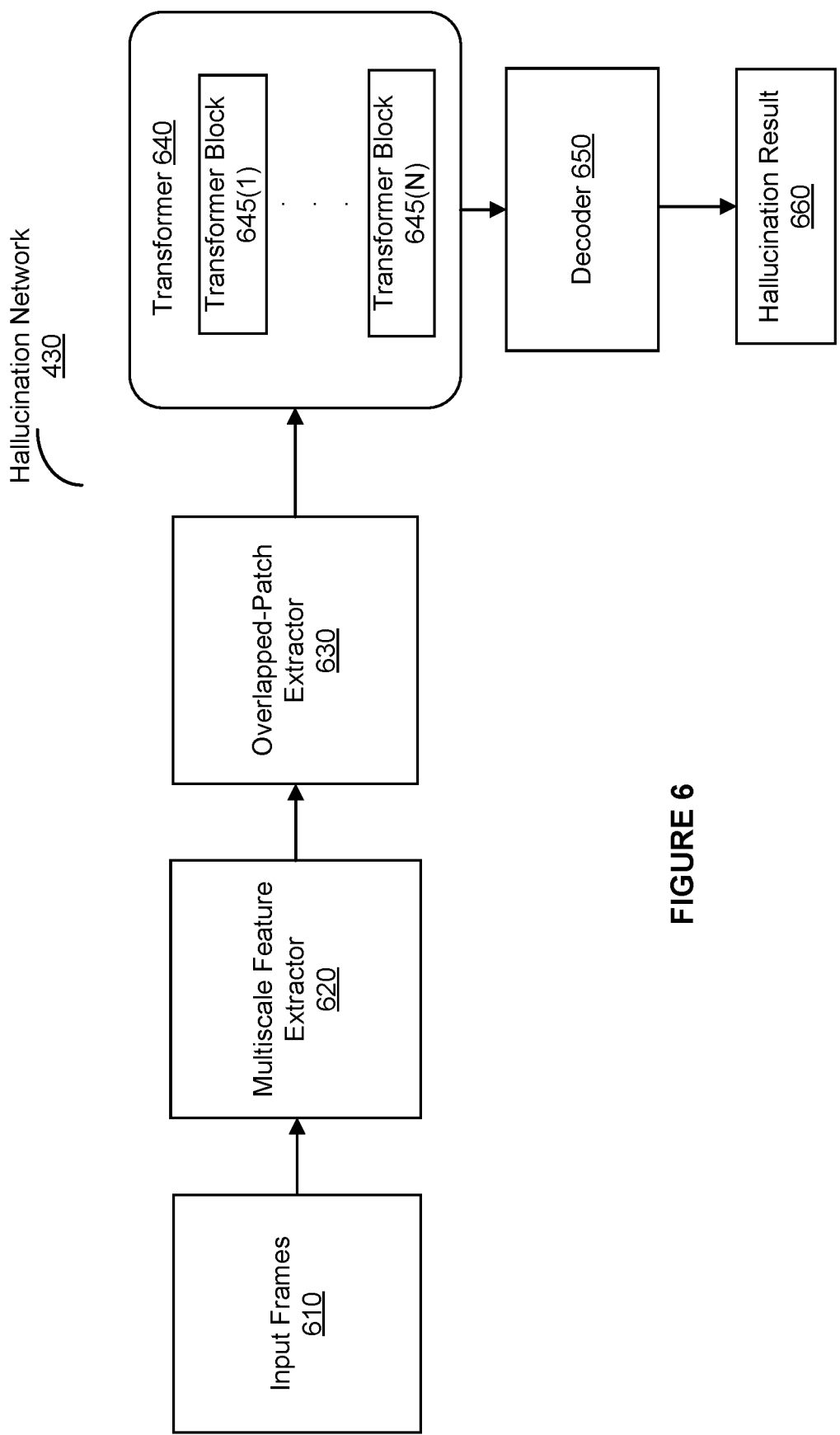
FIG. 6 is a more detailed illustration of the hallucination network of FIG. 4 according to various embodiments.

FIG. 6 is a more detailed illustration of the hallucination network 430 of FIG. 4, according to various embodiments. As shown, hallucination network 430 operates on input frames 610 and generates a hallucination result 660 as an output. Hallucination network 430 includes multiscale feature extractor 620, overlapped-patch extractor 630, and transformer 640.

In various embodiments, hallucination network 430 is a transformer based DNN, which takes as input the input frames 610. Input frames 610 are the concatenation of the current frame, $i_C^{LDR}$, and the selected reference frame, $i_R^{LDR}$, identified by reference frame selection network 420. In other embodiments, hallucination network 430 may operate on input frames 610 that are the concatenation of the current frame, $i_C^{LDR}$, and multiple reference frames, $i_{R1}^{LDR}$, $i_{R2}^{LDR}, \ldots, i_{Rn}^{LDR}$. In various embodiments, the computational cost associated with hallucination network 430 increases as the number of reference frames being used increases.

Hallucination network 430 is trained using a cost function with one adversarial term, $\mathcal{L}_{adv}$, and one reconstruction error term $\mathcal{L}_{rec}$ $$\mathcal{L} = \lambda_{rec}\mathcal{L}_{rec} + \lambda_{adv}\mathcal{L}_{adv},$$

where $\lambda_{rec}$ and $\lambda_{adv}$ weight the relative importance of the two terms. The reconstruction loss term is defined as a mask only loss (MOL), $$\mathcal{L}_{rec} = \mathcal{L}_{mask} = \|(i_c^{HDR} - \hat{i}_c^{HDR}) \odot M\|_1$$

where $i_c^{HDR}$ is the ground truth image, $\hat{i}_c^{HDR}$ is the hallucinated network output, and M is a mask indicating the corrupted area. Hallucination network 430 is trained in two phases. First, hallucination network 430 is pre-trained on inpainting on a large, general dataset containing high resolution LDR videos. Pre-training allows hallucination network to learn features that are relevant for hallucinating HDR details. Next, hallucination network 430 is trained on a dataset consisting of HDR sequences and augmented to sample random reference ($i_R^{HDR}$) and current ($i_C^{HDR}$) frame pairs and randomly change their exposures independently from each other. The LDR input $i_C^{LDR}, i_R^{LDR}$ is obtained by clipping $i_C^{HDR}, i_R^{HDR}$ to the $85^{th}$ percentile of their combined values. Clipping is performed on each color channel to introduce color artifacts generating the LDR input. The ground truth frame is computed by clipping $i_C^{HDR}$ to the $95^{th}$ percentile of the combined values of $i_C^{HDR}$ and $i_R^{HDR}$.

In various embodiments, multiscale feature extractor 620 creates three lower resolution versions of input frames 610, while retaining the important features of $i_C^{LDR}$ and $i_R^{LDR}$. Multiscale feature extractor 620 downsamples input frames 610 by applying stacks of three convolutional layers with Leaky ReLU activation function and stride 2 in the second layer to input frames 610, resulting in three lower resolution versions of different sizes, referred to as feature maps. In various embodiments, the size of the feature maps is determined based on one or more of the size of input frames 610, the size of the filter, and the stride of the convolution operation. Stride is a parameter that determines the number of pixels to slide the filter matrix in the convolutional layer over the image. Stride 2 moves the filter two pixels at a time. A larger stride will result in smaller feature maps. Next, multiscale feature extractor 620 resizes the feature maps to the largest scale and the maps are concatenated along the channel dimension. Concatenating feature maps allows the model to learn more complex features, resulting in higher accuracy and better generalization. The concatenated feature map is then passed to patch extractor 630.

Patch extractor 630 splits the output of multiscale feature extractor 620 into N overlapped patches, each patch of size 7×7, with 4 pixels overlapping in each direction. Patch extractor 630 reshapes the 2-dimensional patches into a sequence of flattened 1 dimensional patch embeddings, $z_0=[e^1; e^2; \ldots, e^N]$. Patch extractor transmits the embeddings $z_0$ to transformer 640.

Transformer 640 is a deep learning architecture based on self-attention to compute representations of the input and output. Self-attention relates different positions of a single sequence and is used to compute a representation of the sequence. Transformer 640 consists of multiple transformer blocks 645. Transformer block 645 extracts features from the input sequence and passes those features to decoder 650. Decoder 650 uses the features to produce hallucination result 660. Hallucination result 660 is an HDR image version of the current frame, $i_C^{LDR}$, contained in input frames 610. Hallucination result 660 consist of the hallucinated missing details in the overexposed areas of the LDR frame, $i_C^{LDR}$.

Figure 7:
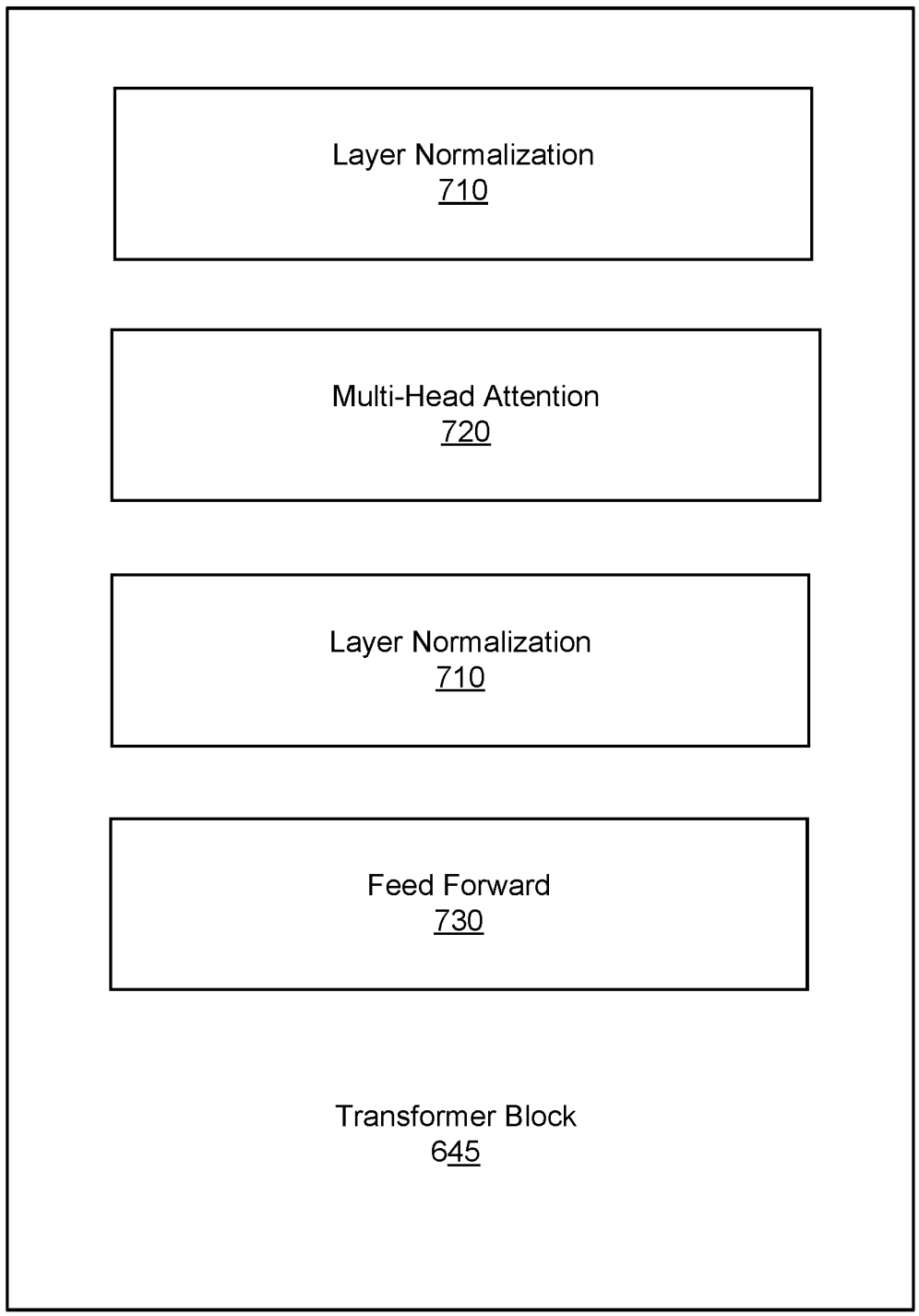
FIG. 7 is a more detailed illustration of the transformer block of FIG. 5 according to various embodiments.

FIG. 7 is a more detailed illustration of transformer block 645 of FIG. 6, according to various embodiments. Patch extractor 630 transmits the embeddings $z_0$ to transformer block 645 of transformer 640. Each transformer block includes a Layernorm (LN) layer 710, followed by a multi-head self-attention (MSA) layer 720, another LN layer 710, then a multi-layer perceptron (MLP) feed-forward layer 730, $$z'_l = MSA(LN(z_{l-1})) + z_{l-1}$$
$$z_l = MSP(LN(z'_l)) + z'_l$$
$$y = LN(z_l)$$

for l=1, ..., j, where j is the number of transformer blocks 645. LN layer 710 computes the mean and variance from all summed inputs. A self-attention layer computes a weighted sum over all values in an input sequence. MSA layer 720 computes k self-attention layers in parallel and concatenates the outputs. The relative position of the semantic elements in input frames 610 contains important information needed for hallucination. Thus, a relative position bias is added to each attention head, $$Att(Q, K, V) = \text{Softmax}((QK^T + B/\sqrt{d})V),$$

where Q, K, and V are the query, key, and value vectors respectively, d is the dimension of query/key, and B is the relative position matrix whose values lie in the interval [−N+1, N−1]. In various embodiments, MLP layer 730 consists of two linear transformations MLP(x)=σ($W_1$x+$b_1$)$W_2$+$b_2$, where σ is an activation function, such as the rectified linear unit (ReLU) defined by σ(x)=max {0, x}.

Figure 8:
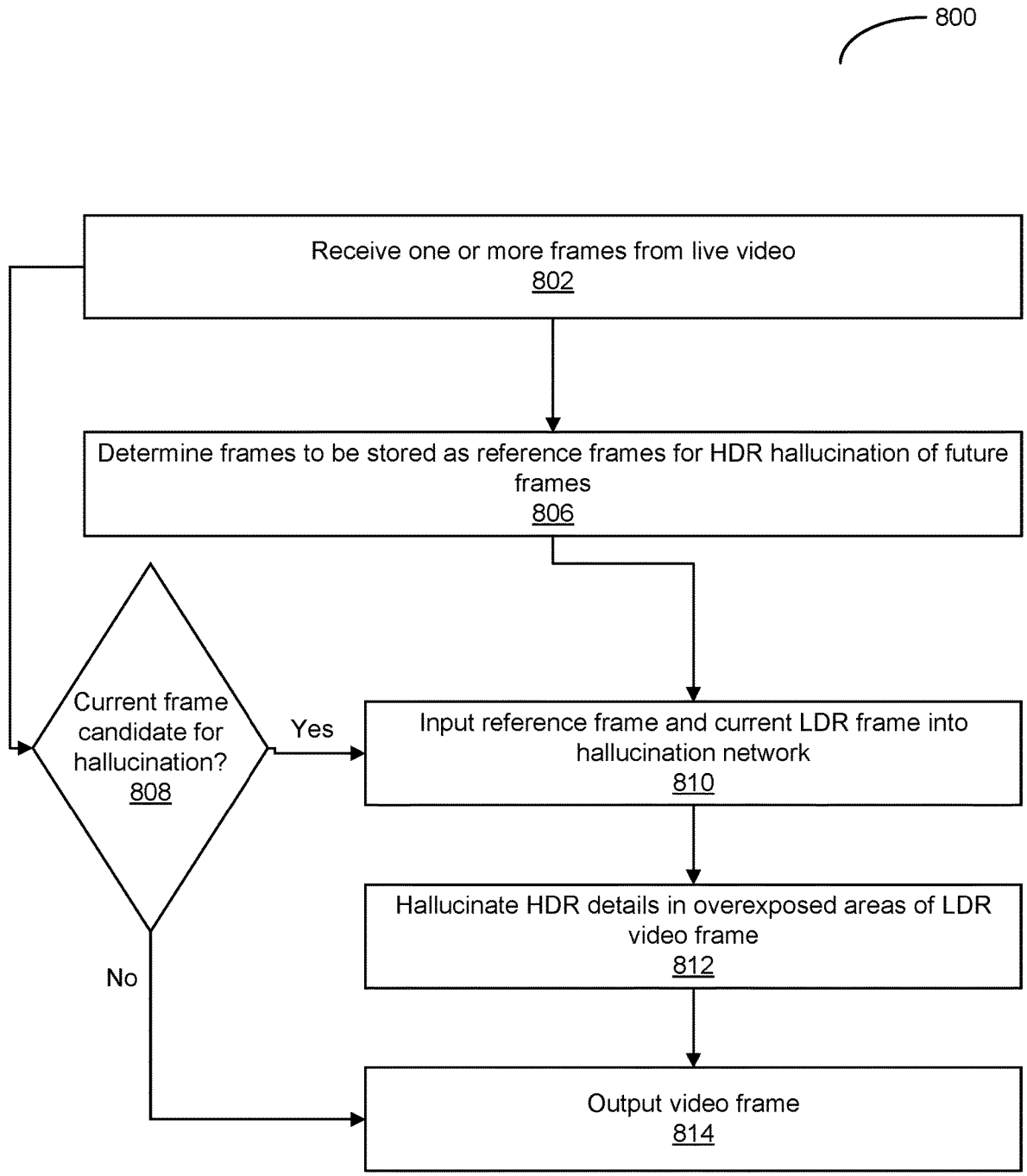
FIG. 8 is a flow diagram of method steps for hallucinating HDR details in overexposed areas of LDR videos, according to various embodiments.

FIG. 8 is a flow diagram of method steps for hallucinating HDR details in overexposed areas of LDR videos, according to various embodiments. Although the method steps are described with reference to the systems of FIGS. 1-7, persons skilled in the art will understand that any system configured to implement the methods steps, in any order, falls within the scope of the embodiments.

As shown, method 800 begins at step 802, where live video processing subsystem 405 receives one or more frames of live video from a video capture device, such as a smartphone or a webcam. At step 806, reference frame selection network 420, within live video processing subsystem 405, determines one or more frames in the memory that are to be stored as reference frames for HDR hallucination of future frames.

If, at step 808, the current frame received at step 802 is a candidate for hallucination, the method proceeds to step 810. At step 810, the live video processing subsystem 405 transmits the current frame and reference frames selected at step 806 to hallucination network 430 within the live video processing subsystem 405. At step 812, the hallucination network 430 generates an HDR version of the LDR video frame based on the reference frame. At step 814, live video processing subsystem 405 outputs the HDR video frame for display.

In sum, a transformer based DNN is used to hallucinate HDR details in overexposed areas of LDR videos. This DNN uses a multi-scale architecture and takes as input two frames: the current frame, which is usually overexposed, and a selected reference frame, which is usually underexposed. The reference frames are selected using a DNN trained through reinforcement learning. The output of the network is a hallucination result corresponding to the current frame.

One advantage of the systems disclosed herein is the causal reference frame selection. Using only currently available reference frames and no future frames allows the system to work on-the-fly and without full camera control. In addition, the reference frame selection DNN stores the most promising frames that could be used for hallucinating HDR details in the future. Finally, the selection of fewer, good reference frames, rather than a large set of reference frames results in better inpainting results and has smaller computational cost. These technical advantages provide one or more technological improvements over prior art approaches.

1. In some embodiments, a computer-implemented method comprises receiving one or more frames of a live video captured by a video capturing device, wherein the one or more frames include a current frame that is most-recently captured, identifying a set of reference frames included in the one or more frames based on at least the current frame, wherein each frame in the set of reference frames has a different exposure level relative to the current frame, determining, using one or more neural networks, a set of missing details for one or more regions of the current frame based on the set of reference frames, generating an updated version of the current frame based on the set of details, and outputting the updated version of the current frame in real-time for display.

2. The method of clause 1, wherein the one or more frames include at least two consecutive frames captured immediately prior to the current frame 3. The method of clauses 1 or 2, wherein the set of reference frames includes only one of the at least two consecutive frames.

4. The method of any of clauses 1-3, wherein the set of reference frames is identified using a reference frame selection network that determines whether a given frame should be a reference frame based on a quality of future frames for which missing details are determined.

5. The method of any of clauses 1-4, wherein each of the one or more regions of the current frame is overexposed or underexposed.

6. The method of any of clauses 1-5, wherein the one or more neural networks comprises a transformer-based neural network.

7. The method of any of clauses 1-6, wherein determining the set of missing details comprises inputting the current frame and at least one frame in the set of reference frames into the one or more neural networks that generate the set of missing details.

8. The method of any of clauses 1-7, wherein determining the set of missing details comprises extracting one or more features from the current frame and at least one frame in the set of reference frames, and decoding the one or more features to produce the set of missing details.

9. The method of any of clauses 1-8, wherein at least one of the one or more neural networks is trained using a cost function with one adversarial term, $\mathcal{L}_{adv}$, and one reconstruction error term $\mathcal{L}^{rec}$, wherein $\mathcal{L}_{rec}$ is defined as $\mathcal{L}_{rec}=\|(i_c^{HDR}-\hat{i}_c^{HDR})\odot M\|_1$, where $i_c^{HDR}$ is a ground truth image, $\hat{i}_c^{HDR}$ is a network output, and M is a mask indicating a corrupted area in the ground truth image.

10. In some embodiments, one or more non-transitory computer readable media store instructions that, when executed by one or more computing devices, cause the one or more computing devices to perform the steps of receiving one or more frames of a live video captured by a video capturing device, wherein the one or more frames include a current frame that is most-recently captured, identifying a set of reference frames included in the one or more frames based on at least the current frame, wherein each frame in the set of reference frames has a different exposure level relative to the current frame, determining, using one or more neural networks, a set of missing details for one or more regions of the current frame based on the set of reference frames, generating an updated version of the current frame based on the set of details, and outputting the updated version of the current frame in real-time.

11. The one or more non-transitory computer-readable media of clause 10, wherein the one or more frames include at least two consecutive frames captured immediately prior to the current frame.

12. The one or more non-transitory computer-readable media of clauses 10 or 11, wherein the set of reference frames is identified using a reference frame selection network that determines whether a given frame should be a reference frame based on a quality of future frames for which missing details are determined.

13. The one or more non-transitory computer-readable media of any of clauses 10-12, wherein each frame in the set of reference frames is spatially similar to the current frame.

14. The one or more non-transitory computer-readable media of any of clauses 10-13, wherein each of the one or more regions of the current frame is overexposed or underexposed.

15. The one or more non-transitory computer-readable media of any of clauses 10-14, wherein the one or more neural networks comprises a transformer-based neural network.

16. The one or more non-transitory computer-readable media of any of clauses 10-15, wherein determining the set of missing details comprises inputting the current frame and at least one frame in the set of reference frames into the one or more neural networks that generate the set of missing details.

17. The one or more non-transitory computer-readable media of any of clauses 10-16, wherein determining the set of missing details comprises extracting one or more features from the current frame and at least one frame in the set of reference frames, and decoding the one or more features to produce the set of missing details.

18. The one or more non-transitory computer-readable media of any of clauses 10-17, wherein at least one of the one or more neural networks is trained using a cost function with one adversarial term, $\mathcal{L}_{adv}$, and one reconstruction error term $\mathcal{L}_{rec}$, wherein $\mathcal{L}_{rec}$ is defined as $\mathcal{L}_{rec} = \|(i_c^{HDR} - \hat{i}_c^{HDR}) \odot M\|_1$, where $i_c^{HDR}$ is a ground truth image, $\hat{i}_c^{HDR}$ is a network output, and M is a mask indicating a corrupted area in the ground truth image.

19. In some embodiments, a computer system comprises one or more memories storing instructions, and one or more processors for executing the instructions to receive one or more frames of a live video captured by a video capturing device, wherein the one or more frames include a current frame that is most-recently captured, identify a set of reference frames included in the one or more frames based on at least the current frame, wherein each frame in the set of reference frames has a different exposure level relative to the current frame, determine, using one or more neural networks, a set of missing details for one or more regions of the current frame based on the set of reference frames, generate an updated version of the current frame based on the set of details, and output the updated version of the current frame in real-time.

20. The computer system of clause 19, wherein determining the set of missing details comprises extracting one or more features from the current frame and at least one frame in the set of reference frames, and decoding the one or more features to produce the set of missing details.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method, comprising:
receiving one or more frames of a live video captured by a video capturing device, wherein the one or more frames include a current frame that is most-recently captured;
identifying a set of reference frames included in the one or more frames based on at least the current frame, wherein each frame in the set of reference frames has a different exposure level relative to the current frame;
determining, using one or more neural networks, a set of missing details for one or more regions of the current frame based on the set of reference frames;
generating an updated version of the current frame based on the set of details; and
outputting the updated version of the current frame in real-time for display.

2. The method of claim 1, wherein the one or more frames include at least two consecutive frames captured immediately prior to the current frame.

3. The method of claim 2, wherein the set of reference frames includes only one of the at least two consecutive frames.

4. The method of claim 1, wherein the set of reference frames is identified using a reference frame selection network that determines whether a given frame should be a reference frame based on a quality of future frames for which missing details are determined.

5. The method of claim 1, wherein each of the one or more regions of the current frame is overexposed or underexposed.

6. The method of claim 1, wherein the one or more neural networks comprises a transformer-based neural network.

7. The method of claim 1, wherein determining the set of missing details comprises inputting the current frame and at least one frame in the set of reference frames into the one or more neural networks that generate the set of missing details.

8. The method of claim 1, wherein determining the set of missing details comprises:
extracting one or more features from the current frame and at least one frame in the set of reference frames;
decoding the one or more features to produce the set of missing details.

9. The method of claim 1, wherein at least one of the one or more neural networks is trained using a cost function with one adversarial term, $\mathcal{L}_{adv}$, and one reconstruction error term $\mathcal{L}_{rec}$, wherein $\mathcal{L}_{rec}$ is defined as $\mathcal{L}_{rec} = \|(i_c^{HDR} - \hat{i}_c^{HDR}) \odot M\|_1$, where $i_c^{HDR}$ is a ground truth image, $\hat{i}_c^{HDR}$ is a network output, and M is a mask indicating a corrupted area in the ground truth image.

10. One or more non-transitory computer readable media storing instructions that, when executed by one or more computing devices, cause the one or more computing devices to perform the steps of:
receiving one or more frames of a live video captured by a video capturing device, wherein the one or more frames include a current frame that is most-recently captured;
identifying a set of reference frames included in the one or more frames based on at least the current frame, wherein each frame in the set of reference frames has a different exposure level relative to the current frame;
determining, using one or more neural networks, a set of missing details for one or more regions of the current frame based on the set of reference frames;
generating an updated version of the current frame based on the set of details; and
outputting the updated version of the current frame in real-time.

11. The one or more non-transitory computer-readable media of claim 10, wherein the one or more frames include at least two consecutive frames captured immediately prior to the current frame.

12. The one or more non-transitory computer-readable media of claim 10, wherein the set of reference frames is identified using a reference frame selection network that determines whether a given frame should be a reference frame based on a quality of future frames for which missing details are determined.

13. The one or more non-transitory computer-readable media of claim 10, wherein each frame in the set of reference frames is spatially similar to the current frame.

14. The one or more non-transitory computer-readable media of claim 10, wherein each of the one or more regions of the current frame is overexposed or underexposed.

15. The one or more non-transitory computer-readable media of claim 10, wherein the one or more neural networks comprises a transformer-based neural network.

16. The one or more non-transitory computer-readable media of claim 10, wherein determining the set of missing details comprises inputting the current frame and at least one frame in the set of reference frames into the one or more neural networks that generate the set of missing details.

17. The one or more non-transitory computer-readable media of claim 10, wherein determining the set of missing details comprises:
extracting one or more features from the current frame and at least one frame in the set of reference frames;
decoding the one or more features to produce the set of missing details.

18. The one or more non-transitory computer-readable media of claim 10, wherein at least one of the one or more neural networks is trained using a cost function with one adversarial term, $\mathcal{L}_{adv}$, and one reconstruction error term $\mathcal{L}_{rec}$, wherein $\mathcal{L}_{rec}$ is defined as $\mathcal{L}_{rec} = \|(i_c^{HDR} - \hat{i}_c^{HDR}) \odot M\|_1$, where $i_c^{HDR}$ is a ground truth image, $\hat{i}_c^{HDR}$ is a network output, and M is a mask indicating a corrupted area in the ground truth image.

19. A computer system, comprising:
one or more memories storing instructions;
one or more processors for executing the instructions to:
- receiving one or more frames of a live video captured by a video capturing device, wherein the one or more frames include a current frame that is most-recently captured,
- identifying a set of reference frames included in the one or more frames based on at least the current frame, wherein each frame in the set of reference frames has a different exposure level relative to the current frame,
- determining, using one or more neural networks, a set of missing details for one or more regions of the current frame based on the set of reference frames,
- generating an updated version of the current frame based on the set of details, and
- outputting the updated version of the current frame in real-time.

20. The computer system of claim 19, wherein determining the set of missing details comprises:
- extracting one or more features from the current frame and at least one frame in the set of reference frames;
- decoding the one or more features to produce the set of missing details.

* * * * *